US012581546B2

(12) United States Patent
Park et al.

(10) Patent No.: US 12,581,546 B2
(45) Date of Patent: Mar. 17, 2026

(54) ELECTRONIC DEVICE AND METHOD FOR CONTROLLING THE SAME

(71) Applicant: SAMSUNG ELECTRONICS CO., LTD., Suwon-si (KR)

(72) Inventors: Sanghyuk Park, Suwon-si (KR); Kiyong Lee, Suwon-si (KR); Chaekyu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 361 days.

(21) Appl. No.: 18/140,755

(22) Filed: Apr. 28, 2023

(65) Prior Publication Data

US 2024/0015803 A1 Jan. 11, 2024

Related U.S. Application Data

(63) Continuation of application No. PCT/KR2023/005038, filed on Apr. 13, 2023.

(30) Foreign Application Priority Data

Jul. 6, 2022 (KR) ........................ 10-2022-0083400

(51) Int. Cl.
*H04W 8/00* (2009.01)
*H04W 76/10* (2018.01)
*H04W 76/30* (2018.01)

(52) U.S. Cl.
CPC ........... *H04W 76/10* (2018.02); *H04W 8/005* (2013.01); *H04W 76/30* (2018.02)

(58) Field of Classification Search
CPC ....... H04W 4/80; H04W 76/10; H04W 76/30; H04W 8/005; H04W 8/00
See application file for complete search history.

(56) References Cited

U.S. PATENT DOCUMENTS 9,106,337 B2 8/2015 Jung et al.
10,842,334 B2 11/2020 Wolff et al.
(Continued)

FOREIGN PATENT DOCUMENTS

CN 211243177 U 8/2020
JP 2019-193792 11/2019
(Continued)

OTHER PUBLICATIONS

International Search Report dated Aug. 3, 2023 in International Patent Application No. PCT/KR2023/005038.
(Continued)

*Primary Examiner* — Tuan H Nguyen
(74) *Attorney, Agent, or Firm* — STAAS & HALSEY LLP

(57) ABSTRACT

An electronic device and method thereof. The electronic device includes a sensor; a communicator including circuitry configured to perform wireless communication; and a controller configured to, in response to detection of coupling of the electronic device to an accessory of the electronic device based on an output of the at least one sensor, control the communicator to execute pairing according to a highest strength of an advertising signal among a plurality of accessories of a same type as a type of the accessory coupled to the electronic device, and determine whether a paired accessory, which is paired with the communicator according to the pairing, corresponds to the accessory coupled to the electronic device based on whether state information received from the paired accessory corresponds to state information of the electronic device.

20 Claims, 11 Drawing Sheets

(56) References Cited

U.S. PATENT DOCUMENTS

| | | | |
|---|---|---|---|
| 11,231,806 B2 | 1/2022 | Choi et al. | |
| 11,580,867 B2 | 2/2023 | Wilson et al. | |
| 11,954,270 B2 | 4/2024 | Kang et al. | |
| 2008/0227393 A1 | 9/2008 | Tang et al. | |
| 2016/0213218 A1 | 7/2016 | Ham et al. | |
| 2016/0317767 A1 | 11/2016 | Shelly et al. | |
| 2017/0220490 A1 | 8/2017 | Tan et al. | |
| 2017/0357425 A1* | 12/2017 | Smith | G06F 3/0482 |
| 2018/0288660 A1* | 10/2018 | Honda | H04W 48/16 |
| 2020/0050338 A1 | 2/2020 | Choi et al. | |
| 2020/0163137 A1 | 5/2020 | Alameh et al. | |
| 2021/0194267 A1 | 6/2021 | Shin et al. | |
| 2021/0259494 A1 | 8/2021 | Pruiett | |
| 2022/0164619 A1 | 5/2022 | Savage et al. | |
| 2022/0361726 A1 | 11/2022 | Kwon et al. | |

FOREIGN PATENT DOCUMENTS

| | | |
|---|---|---|
| KR | 10-1640706 | 7/2016 |
| KR | 10-1706138 | 2/2017 |
| KR | 10-1851532 | 6/2018 |
| KR | 10-2020-0017305 | 2/2020 |
| KR | 10-2020-0017308 | 2/2020 |
| KR | 10-2020-0027318 | 3/2020 |
| KR | 10-2020-0035734 | 4/2020 |
| KR | 10-2021-0073058 | 6/2021 |
| KR | 10-2021-0079940 | 6/2021 |
| KR | 10-2253543 | 6/2021 |
| KR | 10-2290760 | 8/2021 |
| KR | 10-2291067 | 8/2021 |
| KR | 10-2021-0112917 | 9/2021 |

OTHER PUBLICATIONS

PCT/ISA/237 dated Aug. 3, 2023 in International Patent Application No. PCT/KR2023/005038.

Extended European Search Report issued May 13, 2025 for Application No. 23835653.9.

* cited by examiner

FIG. 4

| ACCESSORY (15) | STATE INFORMATION |
| --- | --- |
| BATTERY (15a) | REMAINING CHARGE LEVEL, BATTERY CHARGE/DISCHARGE INFORMATION |
| BRUSH (15b) | RPM INFORMATION, BRUSH CURRENT INFORMATION |
| DOCKING STATION (15c) | DUST DISCHARGE OPERATION INFORMATION, CHARGING OPERATION INFORMATION, CLEANER STATE INFORMATION |

15-1 : 15a-1, 15b-1, 15c-1
15-2 : 15b-1, 15b-2
15-3 : 15c-1, 15c-2, 15c-3

③ COMPARE STATE INFORMATION

| STATE INFO OF ELECTRONIC DEVICE | STATE INFO OF RECEIVED ACCESSORY |
|---|---|
| COMMAND TO PERFORM CLEANING MOTOR/ BATTERY STATE INFO (CURRENT) | DISCHARGE STATE INFO (CURRENT) |

① PAIRING

② TRANSMIT STATE INFORMATION

④ RELEASE AND RESTRICT PAIRING

⑤ PAIRING

③ COMPARE STATE INFORMATION

| STATE INFO OF ELECTRONIC DEVICE | STATE INFO OF RECEIVED ACCESSORY |
|---|---|
| COMMAND TO PERFORM CLEANING BRUSH STATE INFO (CURRENT) | BRUSH STATE INFO (CURRENT) |

① PAIRING

② TRANSMIT STATE INFORMATION

④ RELEASE AND RESTRICT PAIRING

⑤ PAIRING

③ COMPARE STATE INFORMATION

| STATE INFO OF ELECTRONIC DEVICE | STATE INFO OF RECEIVED ACCESSORY |
|---|---|
| SENSING INFO OF PRESSURE SENSOR OPERATION COMMAND INFO | DUST DISCHARGE OPERATION INFO |
| BATTERY STATE INFOR OPERATION COMMAND INFO | CHARGING OPERATION INFO |

ELECTRONIC DEVICE AND METHOD FOR CONTROLLING THE SAME

CROSS-REFERENCE TO RELATED APPLICATION

This application is a continuation application, under 35 U.S.C. § 111(a), of international application No. PCT/KR2023/005038, filed on Apr. 13, 2023, which claims priority under 35 U.S.C. § 119 to Korean Patent Application No. 10-2022-0083400, filed Jul. 6, 2022, the disclosures of which are incorporated herein by reference in their entirety.

BACKGROUND

Field

The disclosure relates to an electronic device which exchanges information with an accessory.

Discussion of Related Art

An electronic device may be generally coupled to an accessory such as a battery and may communicate with the accessory via a line. For example, the electronic device may receive information, e.g., a remaining charge level, from the battery.

Specifically, the accessory needs to be coupled or decoupled, so the electronic device may be equipped with a terminal in addition to a line for wired connection and connected to the accessory in a normal wired communication scheme, e.g., with a universal asynchronous receiver/transmitter (UART).

However, repeated coupling and decoupling of the accessory may make the terminal deteriorate, and especially when a shock is applied to the electronic device, deterioration of the terminal may be accelerated, in which case a success rate of communication connection may decrease.

SUMMARY

According to an embodiment, an electronic device includes at least one sensor; a communicator including circuitry configured to perform wireless communication; and a controller configured to: in response to detection of coupling of the electronic device to an accessory of the electronic device based on an output of the at least one sensor, control the communicator to execute pairing according to an advertising signal having a highest strength among advertising signals outputted by a plurality of accessories of a same type as a type of the accessory coupled to the electronic device, and determine whether a paired accessory, which is paired with the communicator according to the pairing, corresponds to the accessory coupled to the electronic device based on whether state information received from the paired accessory corresponds to state information of the electronic device.

The controller may control the communicator to scan for the advertising signals outputted by the plurality of accessories of the same type as the type of the accessory coupled to the electronic device in response to the detection of the coupling of the accessory.

The controller may control the communicator to transmit or receive state information to or from the paired accessory.

The controller may release the pairing with the paired accessory provided the paired accessory does not correspond to the accessory coupled to the electronic device.

The controller may restrict the pairing with the paired accessory in response to the paired accessory not corresponding to the accessory coupled to the electronic device, and control the communicator to pair with another accessory based on a strength of the advertising signals.

The state information of the electronic device may include at least one of sensing information received from the at least one sensor or operation command information.

Based on the accessory coupled to the electronic device being a battery, the controller may determine whether the paired accessory which is a battery corresponds to the accessory coupled to the electronic device as the battery based on whether discharge state information received from the paired accessory as the corresponds to the operation command information or sensing information of the at least one sensor.

The electronic device may be a vacuum cleaner and based on the accessory coupled to the electronic device being a brush, the controller may determine whether the paired accessory which is a brush corresponds to the accessory coupled to the electronic device as the brush based on whether state information received from the paired accessory as the brush corresponds to the operation command information or sensing information of a current applied to the accessory coupled to the electronic device as the brush.

The electronic device may be a vacuum cleaner and based on the accessory coupled to the electronic device being a docking station and state information received from the docking station indicating that a dust discharge course is performed, the controller may determine whether the paired accessory as the docking station corresponds to the accessory coupled to the electronic device as the docking station based on whether the state information received from the paired accessory as the docking station corresponds to the operation command information or sensing information of a pressure sensor of the at least one sensor.

The electronic device may be a vacuum cleaner and based on the accessory coupled to the electronic device being a docking station and state information received from the docking station indicating that a charge course is performed, the controller may determine whether the paired accessory as the docking station corresponds to the accessory coupled to the electronic device as the docking station based on whether state information received from the paired accessory as the docking station corresponds to the operation command information or sensing information of a charge current of a battery coupled to the electronic device.

According to an embodiment, a method of controlling an electronic device including at least one sensor and a communicator to perform wireless communication includes, in response to detection of coupling of the electronic device to an accessory of the electronic device based on an output of the at least one sensor, controlling the communicator execute pairing according to an advertising signal having a highest strength among advertising signals outputted by a plurality of accessories of a same type as a type of the accessory coupled to the electronic device; and determining whether a paired accessory, which is paired with the communicator according to the pairing, corresponds to the accessory coupled to the electronic device based on whether state information received from the paired accessory corresponds to state information of the electronic device.

The method may further include controlling the communicator to scan for the advertising signals outputted by the plurality of accessories of the same type as the type of the accessory coupled to the electronic device in response to the detection of the coupling of the accessory.

The method may further include controlling the communicator to transmit or receive state information to or from the paired accessory.

The method may further include releasing the pairing with the paired accessory in response to the paired accessory not corresponding to the coupled accessory.

The method may further include restricting the pairing with the paired accessory provided the paired accessory does not correspond to the accessory coupled to the electronic device; and controlling the communicator to pair with another accessory based on a strength of the advertising signals.

The state information of the electronic device may include at least one of sensing information received from the at least one sensor or operation command information.

The determining of whether the paired accessory corresponds to the accessory may include, based on the accessory coupled to the electronic device being a battery, determining whether the paired accessory which is a battery corresponds to the accessory coupled to the electronic device as the battery based on whether discharge state information received from the paired accessory as the battery corresponds to the operation command information or sensing information of the at least one sensor.

The electronic device may be a vacuum cleaner and the determining of whether the paired accessory corresponds to the accessory may include, based on the accessory coupled to the electronic device being a brush, determining whether the paired accessory which is a brush corresponds to the accessory coupled to the electronic device as the brush based on whether state information received from the paired accessory as the brush corresponds to the operation command information or sensing information of a current applied to the accessory coupled to the electronic device as the brush.

The electronic device may be a vacuum cleaner and the determining of whether the paired accessory corresponds to the coupled accessory may include, based on the accessory coupled to the electronic device being a docking station and state information received from the docking station indicating that a dust discharge course is performed, determining whether the paired accessory as the docking station corresponds to the accessory coupled to the electronic device as the docking station based on whether the state information received from the paired accessory as the docking station corresponds to the operation command information or sensing information of a pressure sensor of the at least one sensor.

The electronic device may be a vacuum cleaner and the determining of whether the paired accessory corresponds to the coupled accessory may include, based on the accessory coupled to the electronic device being a docking station and state information received from the docking station indicating that a charging course is performed, determining whether the paired accessory as the docking station corresponds to the accessory coupled to the electronic device as the docking station based on whether the state information received from the paired accessory as the docking station corresponds to the operation command information or sensing information of a charge current of a battery coupled to the electronic device.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which

FIG. 4 is a diagram for describing an example of state information transmitted or received by an electronic device to or from an accessory, according to an embodiment.

DETAILED DESCRIPTION OF EXEMPLARY EMBODIMENTS

Figure 1:
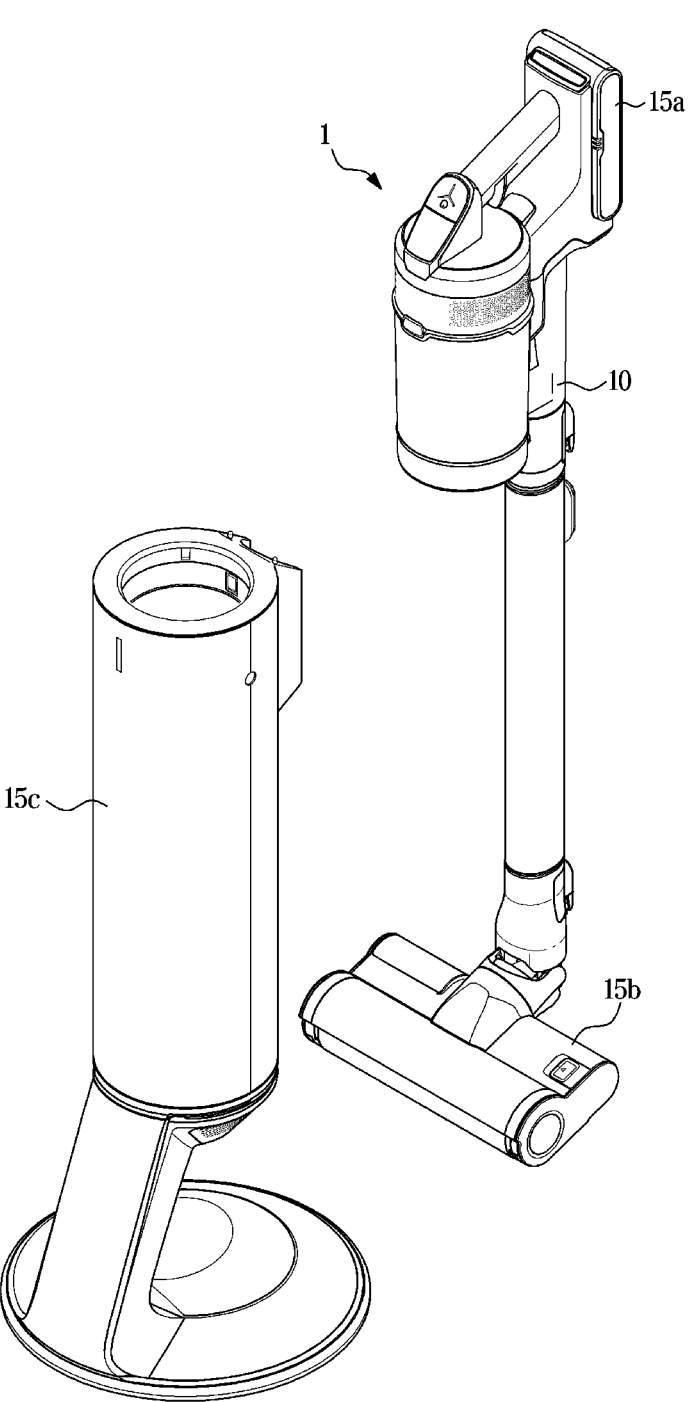
FIG. 1 is an exterior view of an electronic device, according to an embodiment.

Embodiments and features as described and illustrated in the disclosure are merely examples, and there may be various modifications replacing the embodiments and drawings at the time of filing this application.

It will be further understood that the term "connect" or its derivatives refer both to direct and indirect connection, and the indirect connection includes a connection over a wireless communication network.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or room discussed below could be termed a second element, component, region, layer or section without departing from the teachings of the disclosure.

Furthermore, the terms, such as "~part", "~block", "~member", "~module", etc., may refer to a unit of handling at least one function or operation. For example, the terms may refer to at least one process handled by hardware such as field-programmable gate array (FPGA)/application specific integrated circuit (ASIC), etc., software stored in a memory, or at least one processor.

The disclosure provides an electronic device and method for controlling the same, which supports wireless connection to an accessory without user intervention and assists wireless connection by detecting an occasion of wrong connection of the same type of accessory located in the vicinity.

According to an electronic device and method for controlling the same in an embodiment may support wireless connection with an accessory without user intervention and assist the wireless connection by detecting an occasion of wrong connection with the same type of accessory located in the vicinity.

Reference numerals used for method steps are just used to identify the respective steps, but not to limit an order of the steps. Thus, unless the context clearly dictates otherwise, the written order may also be practiced otherwise.

Reference will now be made in detail to embodiments of the disclosure, which are illustrated in the accompanying drawings.

FIG. 1 is an exterior view of an electronic device, according to an embodiment.

Referring to FIG. 1, an electronic device 1 in an embodiment may include a main body 10 and accessories 15a, 15b, and 15c (15) that may be coupled to the main body 10.

For example, the electronic device 1 may correspond to a vacuum cleaner as shown in FIG. 1, and the accessories 15 may include a battery 15a, a brush 15b and a docking station 15c.

The type of the electronic device 1 is not, however, limited thereto, and any type of electronic device is used without limitation as long as the electronic device is coupled with an accessory such as a battery.

Furthermore, the type of the accessory 15 is not limited to the above examples, and any type of accessory is used without limitation as long as the accessory may be coupled or decoupled for an operation of the electronic device 1.

The traditional electronic device may be electrically connected to the accessory via a power line for power and a communication line for communication.

As compared to the traditional electronic device, the electronic device 1 according to the disclosure may also be electrically connected to the accessory 15 via the power line for power but may perform wireless communication with the accessory 15 without the communication line for communication.

Hence, without the communication line and associated terminal, costs and weight may be reduced and electro-static discharge (ESD) that may occur due to exposure of the terminal may be prevented.

Furthermore, through the wireless connection with the accessory 15, the electronic device 1 of the disclosure may prevent reduction in communication efficiency due to deterioration of the communication line and the terminal from repetitive coupling and decoupling of the accessory 15 and operations of the electronic device.

Moreover, the electronic device 1 in the disclosure may increase accuracy in wireless connection by detecting an event of wireless connection with another accessory of the same type located in the vicinity instead of the coupled accessory 15 and correcting the wireless connection to the coupled accessory 15.

Configuration and operations of the electronic device 1 have thus far been briefly described. Control configuration of the electronic device 11 will now be described in detail.

Figure 2:
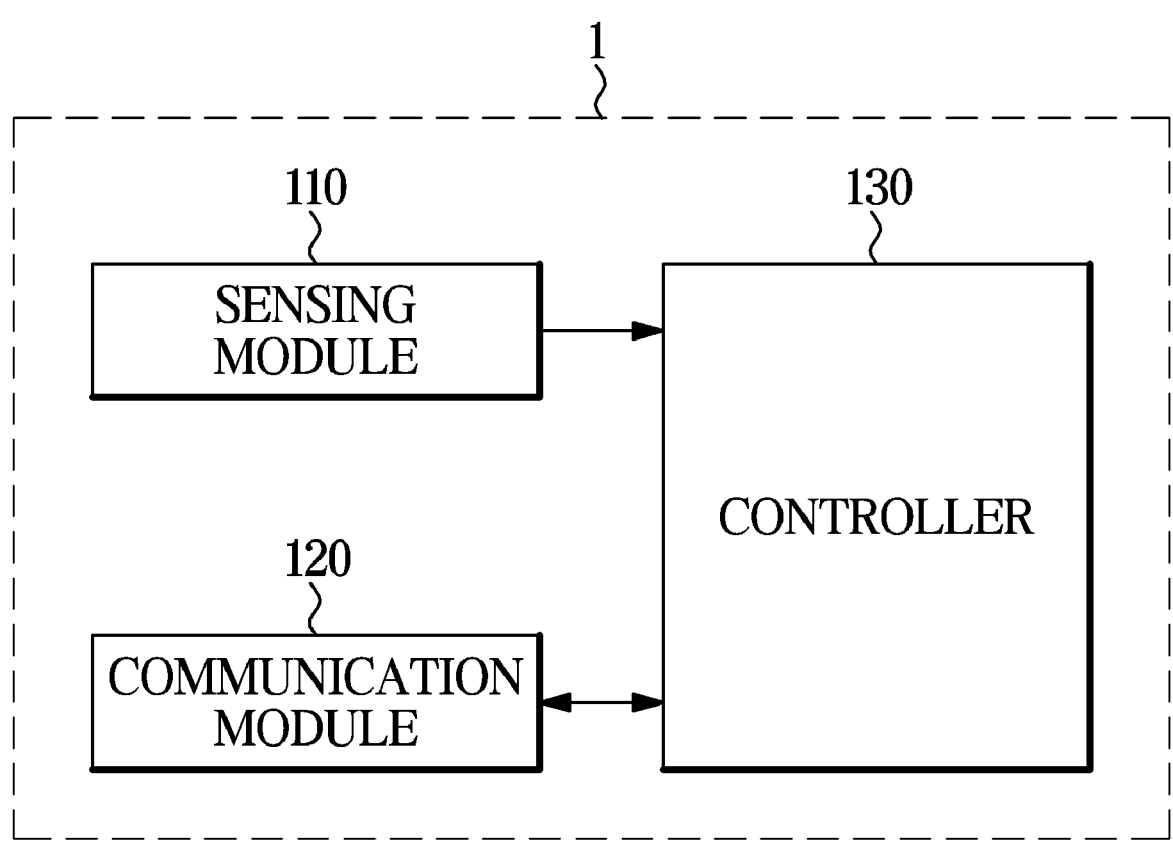
FIG. 2 is a control block diagram of an electronic device, according to an embodiment.

FIG. 2 is a control block diagram of the electronic device 1, according to an embodiment.

Referring to FIG. 2, the electronic device 1 in an embodiment includes a sensing module 110 for detecting various types of operation data of the electronic device 1, a communication module 120 for performing wireless communication with the accessory 15, and a controller 130 for controlling the communication module 120 to perform wireless connection with the accessory 15 when the accessory 15 is coupled thereto and determining validity of the wireless connection.

The control configuration of the electronic device 1 as shown in FIG. 2 is merely an example, and a component that is not shown in FIG. 2 may be added thereto or some of the components shown in FIG. 2 may be omitted.

In an embodiment, the sensing module 110 may detect coupling of the accessory 15. The coupling of the accessory may include a physical coupling of the accessory. The physical coupling may include structural connection, electrical connection and/or wired connection. The sensing module 110 may include at least one sensor.

For example, the sensing module 110 may include a current sensor for detecting a current applied to the accessory 15 or applied from the accessory 15, and detect coupling of the accessory 15 through detection of a current in a power line connected to the accessory 15. In this case, the controller 130 may determine coupling of the accessory 15 by receiving current data detected from the sensing module 110.

Furthermore, the sensing module 110 may include a pressure sensor for detecting pressure applied by coupling of the accessory 15 or a voltage sensor for measuring a voltage at a voltage terminal connected by the coupling of the accessory 15.

The type of the sensing module 110 for detecting coupling of the accessory 15 is not, however, limited to the above example, and there is no limitation on the type as long as it is a known type of coupling detection sensor.

Furthermore, the sensing module 110 in an embodiment may detect an operation state of the electronic device 1.

For example, when the electronic device 1 is a vacuum cleaner, the accessory 15 corresponds to the docking station 15c and a dust discharge course for discharging dust in a dust collection bin of the vacuum cleaner is being performed, the sensing module 110 may include a pressure sensor for detecting a change in atmospheric pressure due to the performing of the dust discharge course.

In an embodiment, the communication module 120 may perform wireless communication with the accessory 15. For this, the communication module 120 may be provided as a known type of wireless communication module, e.g., a Bluetooth low energy (BLE) communication module.

The accessory 15 may also include a wireless communication module for wireless communication with the electronic device 1.

In an embodiment, when coupling of the accessory 15 is detected based on an output of the sensing module 110, the controller 130 may control the communication module 120 to pair with an accessory having the highest strength of an advertising signal among the plurality of accessories 15 of the same type as the type of the coupled accessory 15. The controller 130 may identify a type of the accessory 15 coupled to the electronic device 1. The controller 130 may control the communication module 120 to execute pairing according to an advertising signal having a highest strength among advertising signals outputted by the plurality of accessories 15 of the same type as the type of the coupled accessory 15

In other words, the controller 130 may control the communication module 120 to scan the advertising signal(s) when coupling of the accessory 15 is detected.

Furthermore, the controller 130 may control the communication module 120 to transmit or receive state information to or from the accessory 15 when the accessory 15 is paired with. In this case, the state information of the accessory 15 may include at least one of a sensing information value or an operation setting value of the accessory 15. Furthermore, the state information of the electronic device 1 may include at least one of operation command information of the electronic device 1 or sensing information of the sensing module 110.

In an embodiment, the controller 130 may determine whether the paired accessory 15 corresponds to the coupled accessory 15 based on whether the state information received from the paired accessory 15 corresponds to the state information of the electronic device 1.

For example, when the same type of accessory 15 as the coupled accessory 15 is located around the electronic device 1 and the nearby accessory 15 instead of the coupled accessory 15 is paired with the electronic device 1 due to noise or other reasons, the state information received from the paired accessory 15 may not correspond to the state information of the electronic device 1.

Specifically, when the coupled accessory 15 is the battery 15a, the controller 130 may determine whether the paired battery 15a corresponds to the coupled battery 15a based on whether discharge state information received from the paired battery 15a corresponds to the operation command information of the electronic device 1 or sensing information of a discharge current of the coupled battery 15a.

When the electronic device 1 is a vacuum cleaner and the coupled accessory 15 is the brush 15b, the controller 130 may determine whether the paired brush 15b corresponds to the coupled brush based on whether the state information received from the paired brush 15b corresponds to the operation command information of the electronic device 1 or sensing information of a current applied to the coupled brush 15b.

When the electronic device 1 is a vacuum cleaner, the coupled accessory 15 is the docking station 15c, and the state information received from the paired docking station 15c indicates that a dust discharge course is performed, the controller 130 may determine whether the paired docking station 15c and the coupled docking station 15c correspond to each other based on sensing information of the pressure sensor of the sensing module 110 corresponds to the performing of the dust discharge course.

When the electronic device 1 is a vacuum cleaner, the coupled accessory 15 is the docking station 15c, and the state information received from the paired docking station 15c indicates that a charging course is performed, the controller 130 may determine whether the paired docking station 15c corresponds to the coupled docking station 15c based on whether the state information corresponds to the operation command information of the electronic device 1 or sensing information of a charge current of the coupled battery 15a.

In an embodiment, the controller 130 may release the pairing with the paired accessory 15 when the paired accessory 15 does not correspond to the coupled accessory 15.

In an embodiment, when the paired accessory 15 does not correspond to the coupled accessory 15, the controller 130 may restrict pairing with the paired accessory 15 and control the communication module 120 to pair with another accessory 15 based on strength of the advertising signal.

The controller 130 may include at least one memory for storing a program for carrying out the aforementioned and following operations, and at least one processor for executing the program. In a case that the memory and the processor are each provided in the plural, they may be integrated in a single chip or physically distributed.

The control configuration of the electronic device 1 has thus far been described. How the electronic device 1 performs wireless connection with the accessory 15 will now be described in detail.

Figure 3:
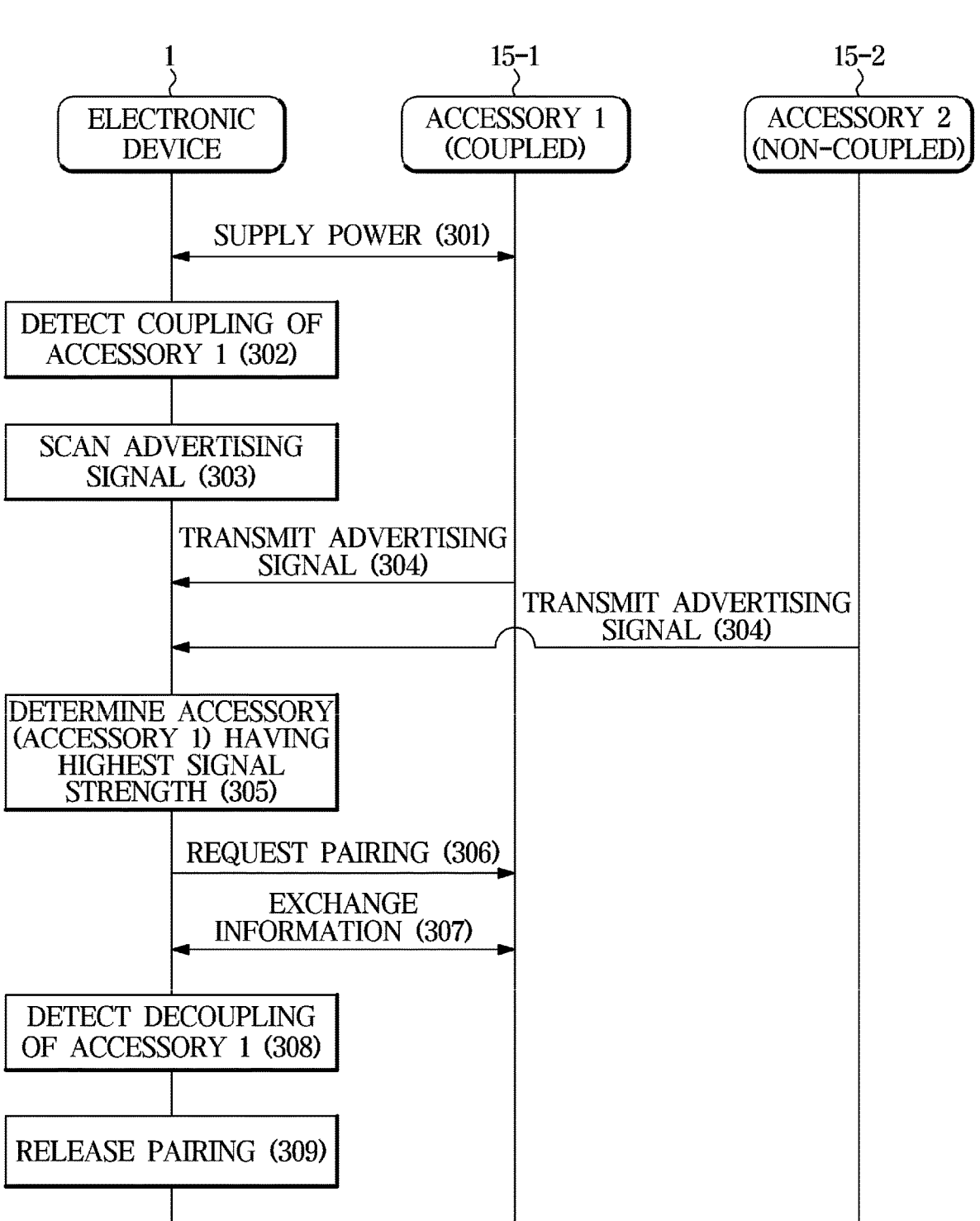
FIG. 3 is a signal flowchart of an electronic device pairing with a coupled accessory, according to an embodiment.

FIG. 3 is a signal flowchart of the electronic device 1 pairing with the coupled accessory 15, according to an embodiment, and FIG. 4 is a diagram for describing an example of state information transmitted or received by the electronic device 1 to or from the accessory 15, according to an embodiment.

Referring to FIG. 3, the electronic device 1 in an embodiment may start supplying power with an accessory 1 15-1 through a power line when the accessory 1 15-1 is coupled to the electronic device 1, in 301.

For example, when the accessory 1 15-1 is a battery, the electronic device 1 may receive power from the accessory 1 15-1 through the power line. When the accessory 1 15-1 is not a battery but an accessory requiring to receive power, the electronic device 1 may supply power received from a battery to the accessory 1 15-1 through the power line.

In an embodiment, the electronic device 1 may detect coupling of the accessory 1 15-1, in 302. Specifically, the electronic device 1 may detect coupling of the accessory 1 15-1 based on the sensing information of the sensing module 110.

For example, the electronic device 1 may detect coupling of the accessory 1 15-1 to the electronic device 1 based on detection of a voltage or current in the power line connected to the accessory 1 15-1.

Furthermore, the electronic device 1 may detect coupling of the accessory 1 15-1 to the electronic device 1 based on a change in pressure due to the coupling of the accessory 1 15-1.

In an embodiment, when detecting coupling of the accessory 1 15-1 in 302, the electronic device 1 may scan an advertising signal in 303.

In other words, the communication module 120 may scan the advertising signal transmitted from the accessory 15 when the accessory 1 15-1 is attached to.

As shown in FIG. 3, not only the accessory 1 15-1 coupled to the electronic device 1 but also an accessory 2 15-2 not coupled with the electronic device 1 may transmit the advertising signal, in 304.

For example, the accessory 2 15-2 may correspond to an extra accessory used for the electronic device 1 or an accessory used for other electronic device than the electronic device 1.

In an embodiment, the electronic device 1 may determine an accessory (e.g., accessory 1 15-1) having the highest signal strength (e.g., a receiver signal strength indicator (RSSI)) and send a request for pairing to the accessory 1 15-1 having the highest signal strength, in 306.

Specifically, the electronic device 1 may determine that the accessory 15 having the highest strength of the advertising signal corresponds to the coupled accessory 15 based on the fact that the nearer the physical distance the larger the advertising signal when the accessory 15 is coupled to the electronic device 1.

More specifically, the electronic device 1 may control the communication module 120 to pair with an accessory (accessory 1 15-1 in FIG. 3) having the highest strength of the advertising signal among the plurality of accessories 15-1 and 15-2 of the same type as the accessory 1 15-1 detected as being coupled to the electronic device 1.

In other words, the electronic device 1 may determine a type of the coupled accessory 1 15-1 based on sensing information of the sensing module 110, determine a type of the accessories 15-1 and 15-2 that transmit the advertising signal based on packet information included in the advertising signal, and control the communication module 120 to pair with the accessory (the accessory 1 15-1 in FIG. 3) having the highest strength of the advertising signal among the plurality of accessories 15-1 and 15-2 of the same type as the type of the accessory 1 15-1 detected as being coupled to the electronic device 1.

Although there are two accessories 15-1 and 15-2 described as an example in FIG. 3, the number of accessories 15 from which the electronic device 1 receives the advertising signal may vary depending on the number of accessories 15 located around the electronic device 1.

In an embodiment, after being paired, the electronic device 1 may exchange information with the accessory 1 15-1, in 307. Specifically, the electronic device 1 may control the communication module 120 to transmit or receive state information to or from the paired accessory 1 15-1.

In this case, the state information of the accessory 15 may include at least one of an operation setting value of the accessory 15 or a sensing information value. Furthermore, the state information of the electronic device 1 may include at least one of operation command information of the electronic device 1 or sensing information of the sensing module 110.

For example, when the accessory 15 corresponds to the battery 15a, the state information of the battery 15a may include remaining charge level information, battery charge/discharge information, etc. When the accessory 15 corresponds to the brush 15b, revolutions per minute (rpm) information, brush current information, etc., may be included. When the accessory 15 is the docking station 15c, state information of the docking station 15c may include dust discharge operation information, charging operation information, etc. Furthermore, the electronic device 1 may transmit its state information (cleaner state information) to the docking station 15c.

After this, in an embodiment, when detecting decoupling of the accessory 1 15-1 in 308, the electronic device 1 may release the pairing with the accessory 1 15-1 in 309.

Specifically, the electronic device 1 may control the communication module 120 to release the pairing with the accessory 1 15-1 when detecting decoupling of the accessory 1 15-1 based on sensing information (e.g., a current or voltage in the power line) of the sensing module 110.

Figure 5:
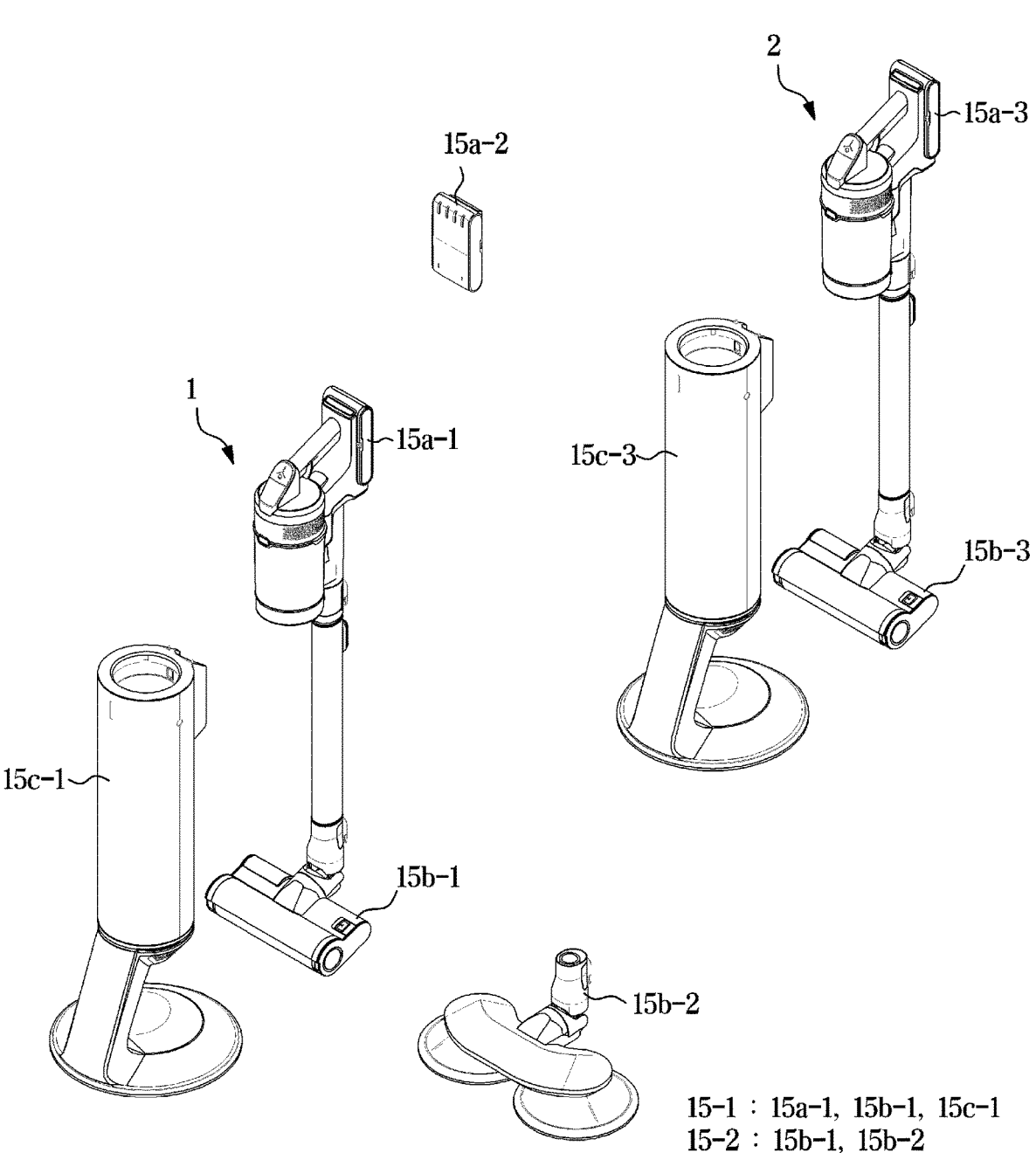
FIG. 5 is a diagram for describing an occasion when an electronic device makes a wrong connection with an accessory other than a coupled accessory, according to an embodiment.

FIG. 5 is a diagram for describing an occasion when the electronic device 1 makes a wrong connection with other accessory 15 than the coupled accessory 15, according to an embodiment.

Referring to FIG. 5, the electronic device 1 in the embodiment may correspond to a vacuum cleaner that performs cleaning by sucking up debris on the floor.

To perform cleaning or other course, the electronic device 1 may be coupled to the accessory 15.

For example, the electronic device 1 may be coupled to a battery 15a-1 for supplying power, a brush 15b-1 that comes into contact with the floor to perform cleaning, and a docking station 15c-1 for discharging debris collected in the dust collection bin of the electronic device 1 or charge the battery 15a-1.

In this case, there may be extra accessories 15a-2 and 15b-2 allocated for the electronic device 1 around the electronic device 1, and there is another electronic device 2 different from the electronic device 1 and there may be accessories 15a-3, 15b-3 and 15c-3 that may be coupled to the other electronic device 2 around the electronic device 1.

In this case, the electronic device 1 may happen to be paired with the accessory 15-2 or 15-3 instead of the coupled accessory 15-1 due to noise, communication fault or a change in location between the accessories.

As such, when the electronic device 1 is paired with the accessory 15-2 or 15-3 other than the coupled accessory 15-1, the electronic device 1 may fail to obtain state information from the coupled accessory 15-1 and may thus not perform an operation intended by the user.

Hence, in an embodiment, the electronic device 1 may determine whether the paired accessory 15 corresponds to the coupled accessory 15 based on whether the state information received from the paired accessory 15 corresponds to the state information of the electronic device 1 including at least one of the operation command information or the sensing information of the sensing module 110, to determine validity of the wireless connection with the paired accessory 15 and repeatedly attempt wireless connection with the coupled accessory 15 when wrong connection is made, thereby increasing accuracy in wireless connection.

How the electronic device 1 determines validity of wireless connection with the accessory 15 will now be described in detail, and characteristics of the determination of validity depending on the type of the accessory 15 will be described.

Figure 6:
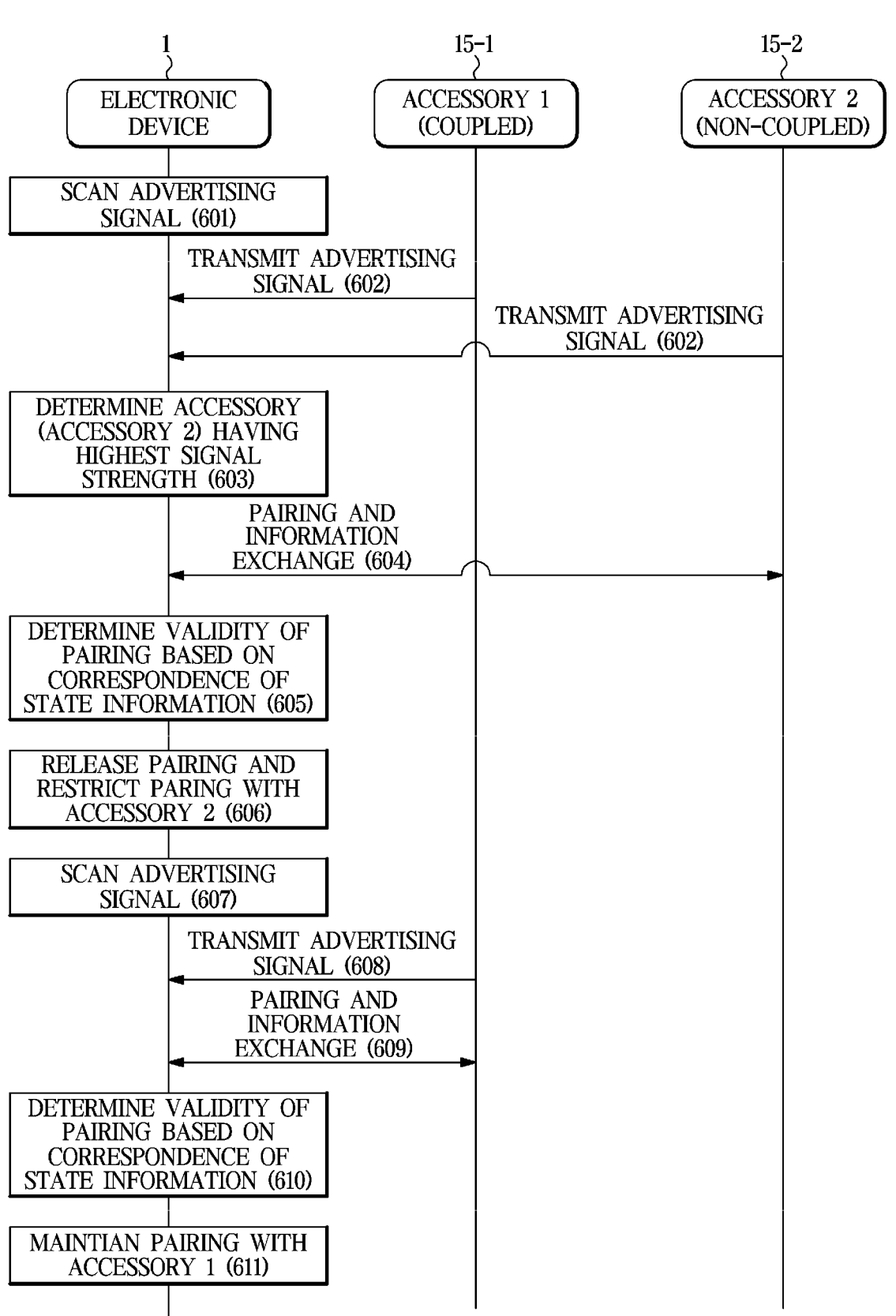
FIG. 6 is a signal flowchart of an electronic device determining validity of pairing with an accessory, according to an embodiment.
Figure 7:
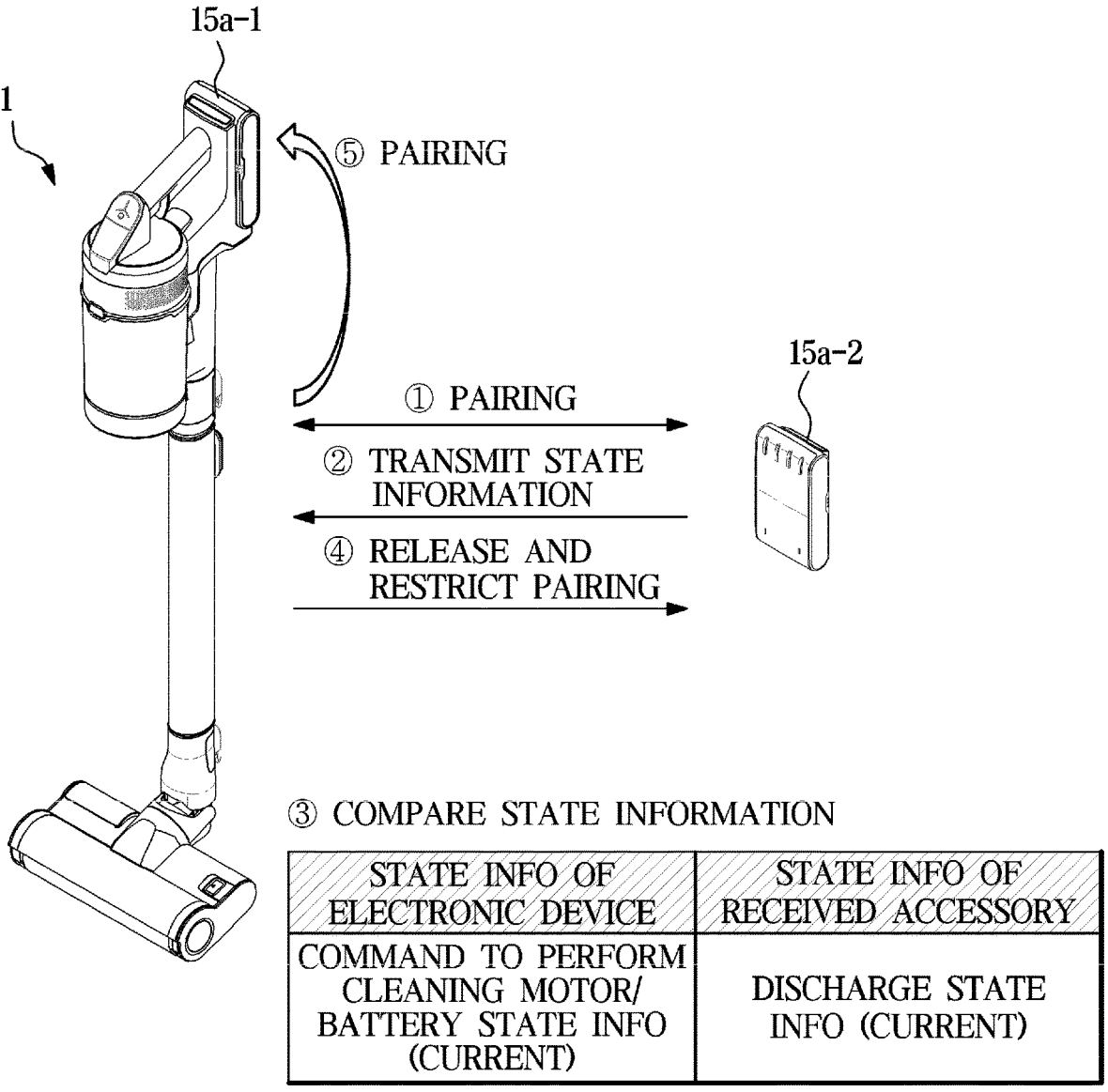
FIG. 7 illustrates an example of an electronic device determining validity of pairing with a battery, according to an embodiment.
Figure 8:
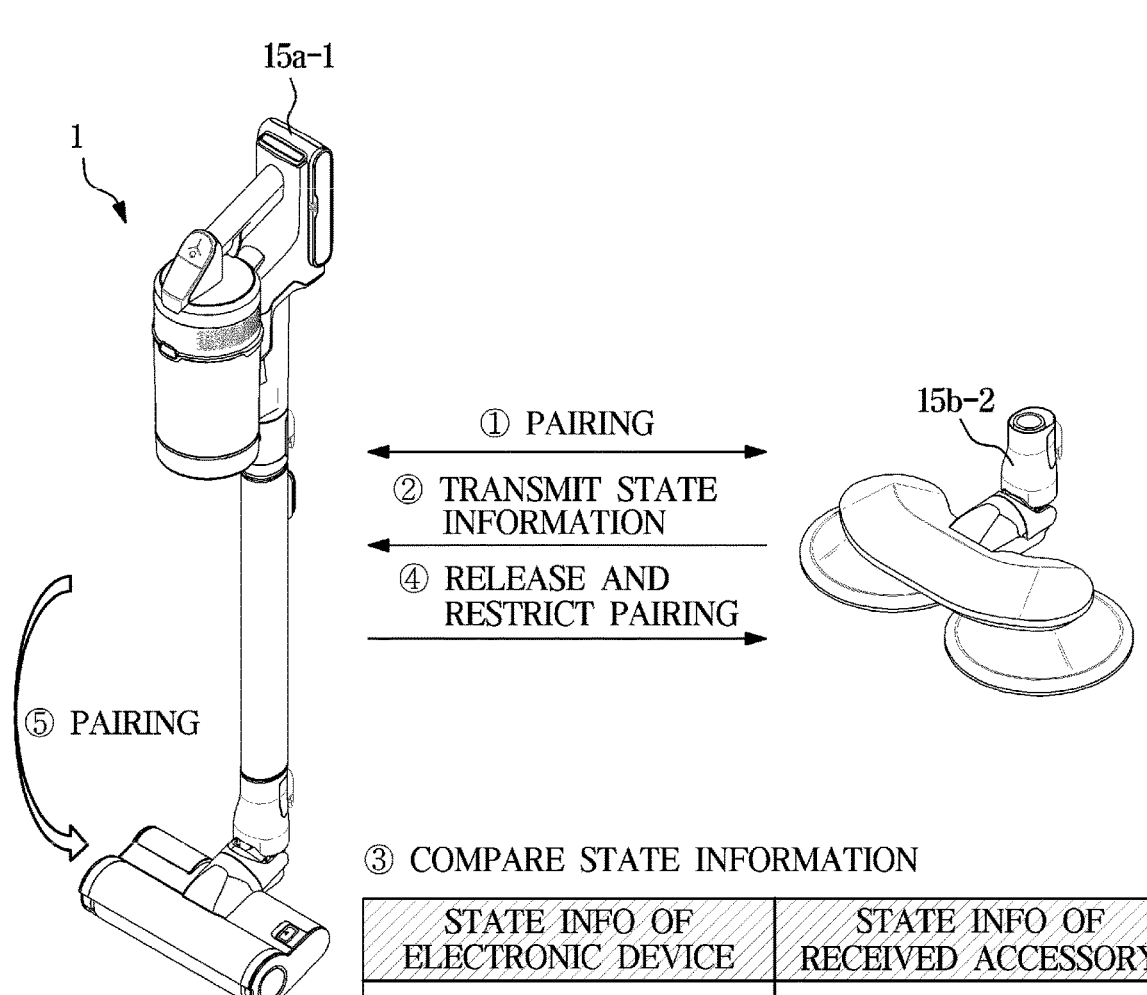
FIG. 8 illustrates an example of an electronic device determining validity of pairing with a brush, according to an embodiment.
Figure 9:
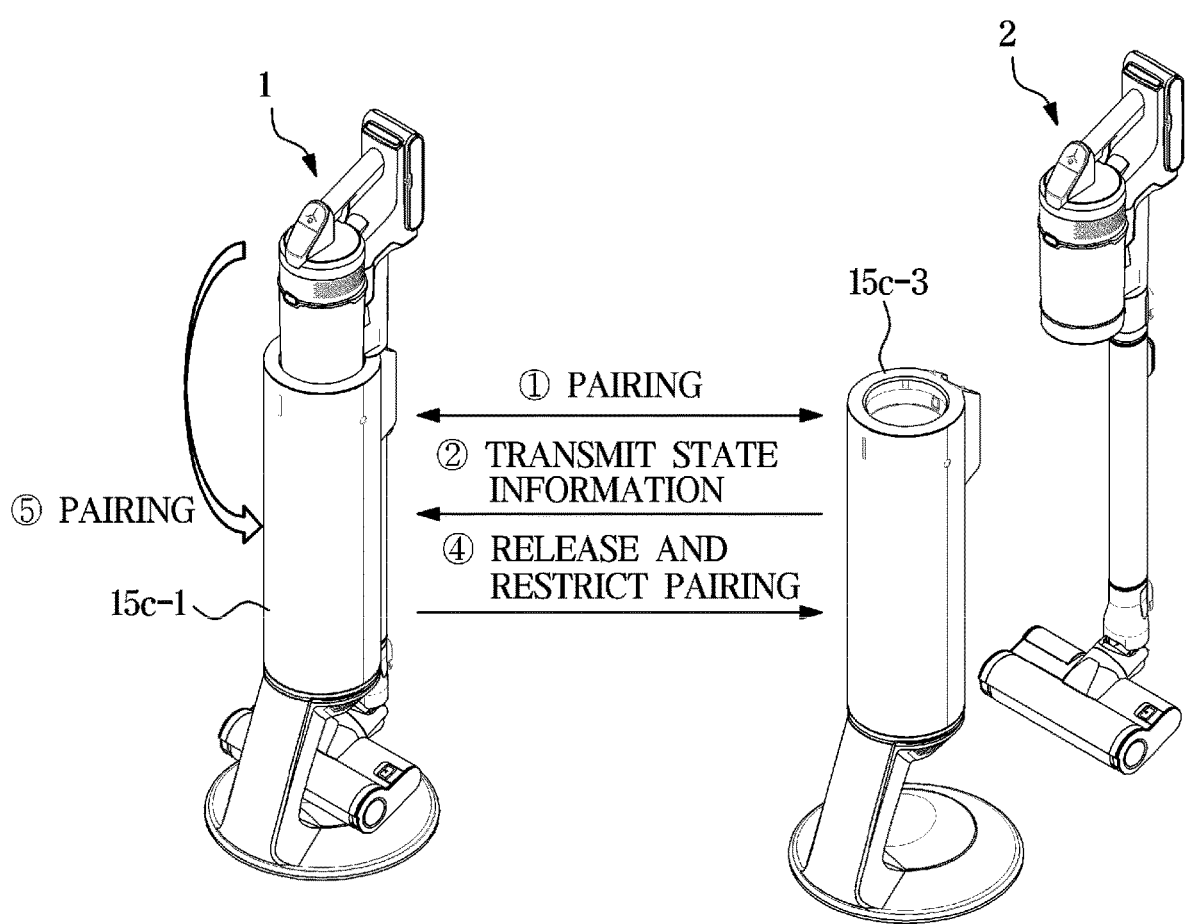
FIG. 9 illustrates an example of an electronic device determining validity of pairing with a docking station, according to an embodiment.

FIG. 6 is a signal flowchart of the electronic device 1 determining validity of pairing with the accessory 15, according to an embodiment, FIG. 7 illustrates an example of the electronic device 1 determining validity of pairing with the battery 15a, according to an embodiment, FIG. 8 illustrates an example of the electronic device 1 determining validity of pairing with the brush 15b, according to an embodiment, and FIG. 9 illustrates an example of the electronic device 1 determining validity of pairing with the docking station 15c, according to an embodiment.

Referring to FIG. 6, the electronic device 1 in an embodiment may scan an advertising signal in 601, and the accessory 1 15-1 coupled to the electronic device 1 and the accessory 2 15-2 not coupled with the electronic device 1 may transmit the advertising signal in 602. Although there is one accessory (the accessory 2 15-2) not coupled with the electronic device 1 in FIG. 6 and the following figures, embodiments of the disclosure are not limited thereto, and an accessory 3 15-3 coupled to the other electronic device 2 may also be included as one that transmits the advertising signal.

In an embodiment, the electronic device 1 may determine an accessory (the accessory 2 15-2) having the highest signal strength in 603, and pair with the accessory (the accessory 2 15-2) having the highest signal strength to exchange information in 604.

In this way, the electronic device 1 may be wirelessly connected to the accessory 2 15-2 instead of the accessory 1 15-1, that is the coupled accessory 15, due to noise, communication error, positional relations between the accessories 15, etc.

In an embodiment, the electronic device 1 may determine validity of pairing based on correspondence of state information, in 605.

In other words, the electronic device 1 may determine whether the paired accessory 15-2 corresponds to the coupled accessory 15-1 based on whether state information received from the paired accessory 15 corresponds to state information of the electronic device 1.

In this case, the state information of the accessory 15-2 may include at least one of an operation setting value of the accessory 15-2 or a sensing information value. Furthermore, the state information of the electronic device 1 may include at least one of operation command information of the electronic device 1 or sensing information of the sensing module 110.

For example, when the same type of accessory 15-2 as the coupled accessory 15-1 is located around the electronic device 1 and the nearby accessory 15-2 instead of the coupled accessory 1 15-1 is paired with the electronic device 1 due to noise or other reasons, the state information received from the paired accessory 15-2 may not correspond to the state information of the electronic device 1.

Specifically, when the coupled accessory 15 is the battery 15a, the electronic device 1 may determine whether the paired battery 15a corresponds to the coupled battery 15a based on whether discharge state information received from the paired battery 15a corresponds to the operation command information of the electronic device 1 or sensing information of the sensing module 110.

That is, the electronic device 1 may be paired with other battery 15a-2 than the coupled battery 15a-1 and may receive state information from the other battery 15a-2.

In this case, the electronic device 1 may determine whether the state information received from the other battery 15a-2 corresponds to the state information of the electronic device 1. For example, when the state information of the electronic device 1 indicates that cleaning is performed while the discharge state information received from the other battery 15a-2 does not indicate discharging of the current, the electronic device 1 may determine that the state information received from the other battery 15a-2 does not correspond to the state information of the electronic device 1, determine that the pairing with the other battery 15a-2 is not valid, and release and restrict the pairing with the other battery 15a-2.

In other words, when an operation command output by the controller 130 indicates that cleaning is to be performed (operation command information), a current or voltage of a suction motor (not shown) is a current or voltage from an operation (sensing information of the sensing module 110), or the state information received from the other battery 15a-2 indicates no discharging while the current or voltage of the coupled battery 15a indicates that the battery is being discharged, the electronic device 1 may determine that the other battery 15a-2 does not correspond to the coupled battery 15a-1.

For example, when the sensing information of the sensing module 110 for a discharge current of the coupled battery 15a-1 does not correspond to a discharge current indicated by the state information received from the paired battery 15a-2, the electronic device 1 may determine that the paired battery 15a-2 may not correspond to the coupled battery 15a-1.

When the electronic device 1 is a vacuum cleaner and the coupled accessory 15 is the brush 15b, the electronic device 1 may determine whether the paired brush 15b corresponds to the coupled brush based on whether the state information received from the paired brush 15b corresponds to the operation command information of the electronic device 1 or sensing information of a current applied to the coupled brush 15b.

That is, the electronic device 1 may be paired with other brush 15b-2 than the coupled brush 15b-1 and may receive state information from the other battery 15b-2.

In this case, the electronic device 1 may determine whether the state information received from the paired brush 15b-2 corresponds to the state information of the electronic device 1. For example, when the state information of the electronic device 1 indicates that cleaning is performed while the state information received from the paired brush 15b-2 does not indicate operation, the electronic device 1 may determine that the state information received from the paired brush 15b-2 does not correspond to the state information of the electronic device 1, determine that the pairing with the paired brush 15b-2 is not valid, and release and restrict the pairing with the paired brush 15b-2.

In other words, when an operation command output by the controller 130 indicates that cleaning is to be performed (operation command information) or operation current information received from the paired brush 15b-2 does not indicate operation while the current or voltage of the coupled brush 15b-1 indicates that the brush is not operating, the electronic device 1 may determine that the paired brush 15b-2 does not correspond to the coupled brush 15a-1.

As shown in FIG. 9, when the electronic device 1 is a vacuum cleaner, the coupled accessory 15 is a docking station 15c-1, and the state information received from a paired docking station 15c-2 indicates that a dust discharge course is being performed, the electronic device 1 may determine whether the paired docking station 15c-2 and the coupled docking station 15c-1 correspond to each other based on whether the sensing information of the pressure sensor of the sensing module 110 corresponds to the performing of the dust discharge course.

Specifically, the electronic device 1 may determine whether the paired docking station 15c-2 corresponds to the coupled docking station 15c-1 based on whether the state information received from the paired docking station 15c-2 corresponds to the sensing information of the pressure sensor of the sensing module 110 based on the fact that pressure changes in the vacuum cleaner according to the airflow sucked in at the docking station 15c when the dust discharge course is performed.

For example, as shown in FIG. 9, when the sensing information of the pressure sensor of the sensing module 110 indicates a change in pressure even though the electronic device 1 receives, from the paired docking station 15c-2, the state information indicating that the dust discharge operation is not performed, the electronic device 1 may determine that the state information received from the paired docking station 15c-2 does not correspond to the sensing information of the pressure sensor of the sensing module 110, and determine that the paired docking station 15c-2 does not correspond to the coupled docking station 15c-1.

When the sensing information of the pressure sensor of the sensing module 110 indicates a change in pressure after the electronic device 1 transmits operation command information to instruct termination of the dust discharge course to the coupled docking station 15c-1 the electronic device 1 may determine that the state information received from the paired docking station 15c-2 does not correspond to the sensing information of the pressure sensor of the sensing module 110, and determine that the paired docking station 15*c*-2 does not correspond to the coupled docking station 15*c*-1.

As shown in FIG. 9, when the electronic device 1 is a vacuum cleaner, the coupled accessory 15 is the docking station 15*c*-1, and the state information received from the paired docking station 15*c*-2 indicates that a charging course is performed, the electronic device 1 may determine whether the paired docking station 15*c*-2 corresponds to the coupled docking station 15*c*-1 based on whether the state information corresponds to the operation command information of the electronic device 1 or sensing information of a charge current of the coupled battery 15*a*.

Specifically, the electronic device 1 may determine whether the paired docking station 15*c*-2 corresponds to the coupled docking station 15*c*-1 based on whether the state information received from the paired docking station 15*c*-2 corresponds to the sensing information of the charge current of the coupled battery 15*a* based on the fact that the current from the battery 15*a* changes when the battery charge course is performed by the docking station 15*c*.

For example, when the electronic device 1 receives sensing information of the sensing module 110 indicating that a charge current flows to the coupled battery 15*a* or sensing information of the sensing module 110 indicating that the battery 15*a* is not fully charged after receiving, from the paired docking station 15*c*-2, state information indicating that no charge current flows from the paired docking station 15*c*-2, the electronic device 1 may determine that the state information received from the paired docking station 15*c*-2 does not correspond to the sensing information of the charge current of the coupled battery 15*c* and determine that the paired docking station 15*c*-2 does not correspond to the coupled docking station 15*c*-1.

When the electronic device 1 receives state information indicating that a charge current flows from the paired docking station 15*c*-2 after the electronic device 1 transmits operation command information instructing termination of charging to the coupled docking station 15*c*-1, the electronic device 1 may determine that the state information received from the paired docking station 15*c*-2 does not correspond to the operation command information and determine that the paired docking station 15*c*-2 does not correspond to the coupled docking station 15*c*-1.

In an embodiment, when determining that the coupled accessory 1 15-1 and the paired accessory 2 15-2 do not correspond to each other, the electronic device 1 releases the pairing with the paired accessory 2 15-2 and restricts pairing with the accessory 2 15-2, in 606.

For example, when determining that the paired accessory 2 15-2 does not correspond to the coupled accessory 1 15-1, the electronic device 1 may add the accessory 2 15-2 to a wrong connection list and restrict pairing with the accessory 2 15-2.

Aftermath, the electronic device 1 may re-perform a course of scanning the advertising signal, in 607. In this case, the accessory 1 15-1 may transmit the advertising signal to the electronic device 1 in 608, and the electronic device 1 may be paired with the accessory 1 15-1 having the highest signal strength to exchange information in 609.

The electronic device 1 may determine validity of the pairing based on correspondence of state information in 610, and maintain the pairing with the accessory 1 15-1 when determining that the coupled accessory 1 15-1 is the paired accessory 1 15-1, in 611.

An embodiment of a method of controlling the electronic device 1 will now be described according to an aspect. As for the method of controlling the electronic device 1, the electronic device 1 in the aforementioned embodiments may be used. Hence, what are described above with reference to FIGS. 1 to 9 may be equally applied in the following method of controlling the electronic device 1.

Figure 10:
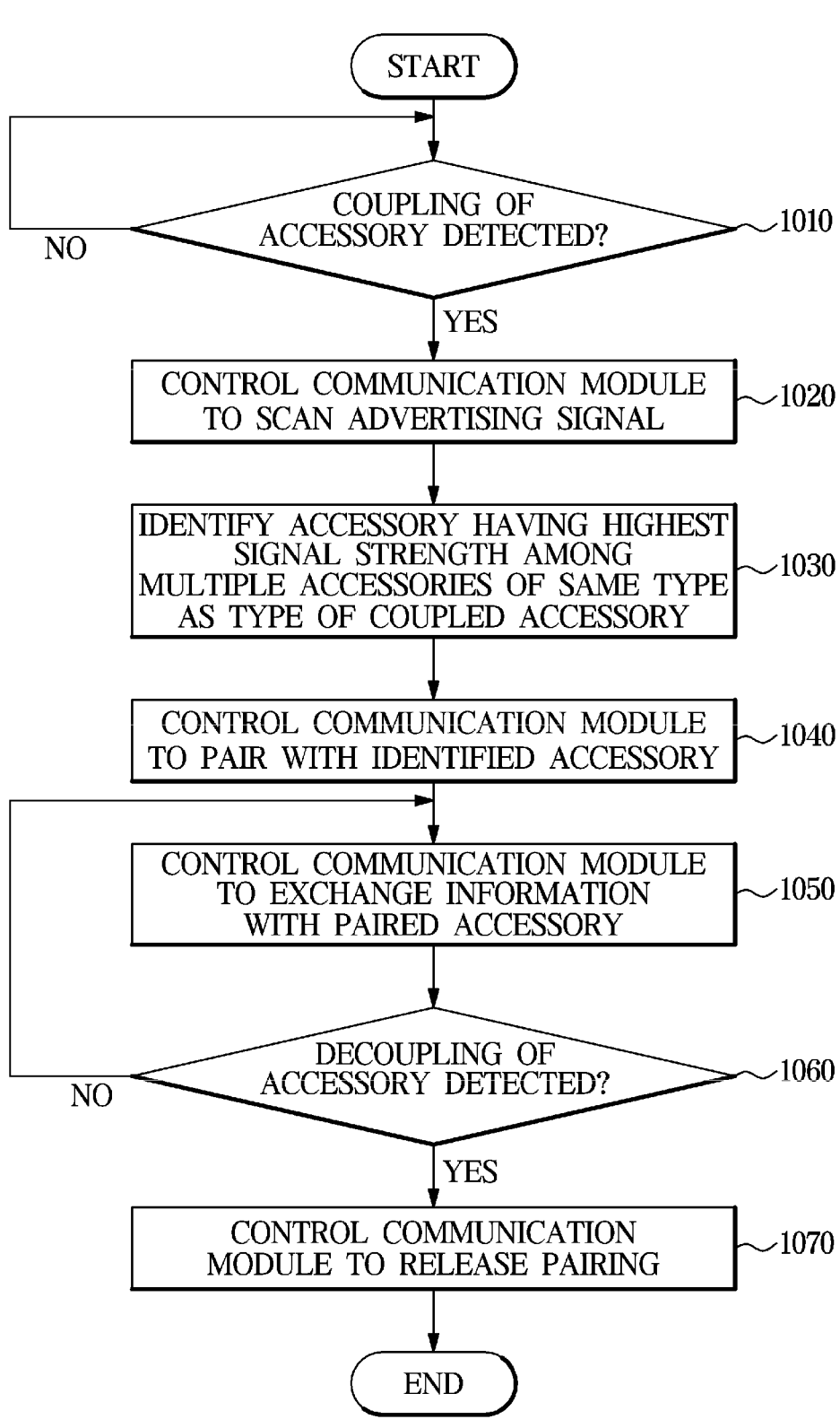
FIG. 10 is a flowchart of performing wireless connection with an accessory in a method of controlling an electronic device, according to an embodiment.

FIG. 10 is a flowchart of performing wireless connection with the accessory 15 in a method of controlling the electronic device 1, according to an embodiment.

Referring to FIG. 10, when coupling of the accessory 15 is detected in 1010, the electronic device 1 may control the communication module 120 to scan the advertising signal, in 1020.

For example, the electronic device 1 may detect coupling of the accessory 15 based on the sensing information of the sensing module 110, and control the communication module 120 to scan the advertising signal transmitted from the detected accessory 15.

In an embodiment, the electronic device 1 may identify the accessory 15 having the highest signal strength among a plurality of accessories of the same type as the coupled accessory 15 in 1030, and control the communication module 120 to pair with the identified accessory 15 in 1040.

Specifically, the electronic device 1 may determine that the accessory 15 having the highest strength of the advertising signal corresponds to the coupled accessory 15 based on the fact that the nearer the physical distance the larger the advertising signal when the accessory 15 is coupled to the electronic device 1.

In other words, the electronic device 1 may determine a type of the coupled accessory 15 based on sensing information of the sensing module 110, determine a type of the accessory that transmits the advertising signal based on packet information included in the advertising signal, and control the communication module 120 to pair with the accessory 15 having the highest strength of the advertising signal among the plurality of accessories of the same type as the type of the accessory 15 detected as being coupled to the electronic device 1.

Furthermore, the electronic device 1 may control the communication module 120 to transmit or receive state information to or from the paired accessory 1 15-1.

In this case, the state information of the accessory 15 may include at least one of an operation setting value of the accessory 15 or a sensing information value. Furthermore, the state information of the electronic device 1 may include at least one of operation command information of the electronic device 1 or sensing information of the sensing module 110.

In an embodiment, when decoupling of the accessory 15 is detected in 1060, the electronic device 1 may control the communication module 120 to release the pairing with the accessory 15, in 1070.

Specifically, the electronic device 1 may control the communication module 120 to release the pairing with the accessory 15 when detecting decoupling of the accessory 15 based on the sensing information (e.g., a current or voltage in the power line) of the sensing module 110.

Figure 11:
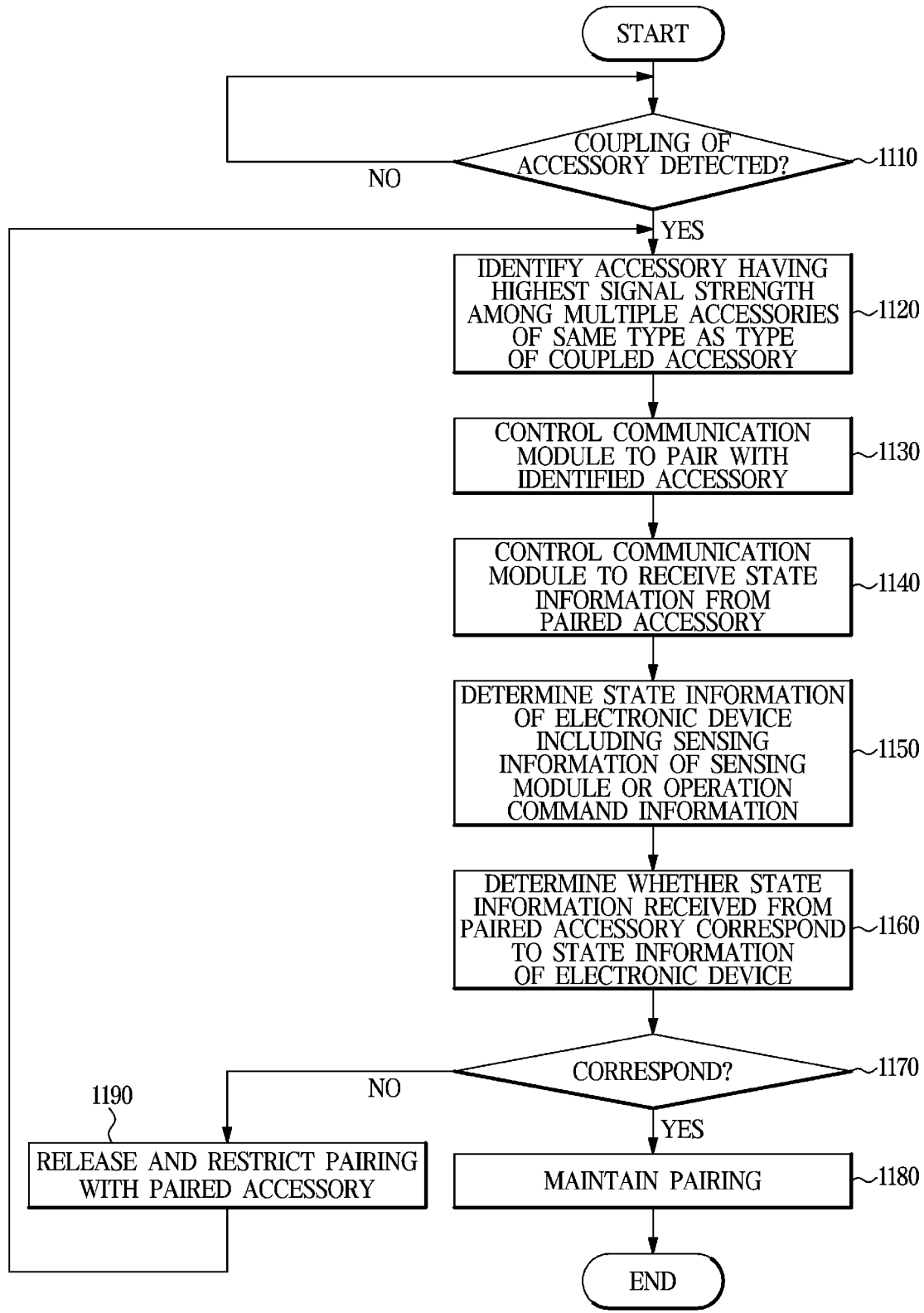
FIG. 11 is a flowchart of determining validity of wireless connection with an accessory in a method of controlling an electronic device, according to an embodiment.

FIG. 11 is a flowchart of determining validity of wireless connection with the accessory 15 in a method of controlling the electronic device 1, according to an embodiment.

Referring to FIG. 11, when detecting coupling of the accessory 15 in 1110, the electronic device 1 may identify the accessory 15 having the highest signal strength among the plurality of accessories 15 of the same type as the coupled accessory 15 in 1120, control the communication module 120 to pair with the identified accessory 15, in 1130, and control the communication module 120 to receive state information from the paired accessory 15 in 1140.

In an embodiment, the electronic device 1 may determine state information of the electronic device 1 including sensing information of the sensing module 110 or operation command information, in 1150.

Specifically, the electronic device 1 may determine state information of the electronic device 1 including at least one of sensing information or operation command information and indicating a state of the electronic device 1.

In an embodiment, the electronic device 1 may determine whether the state information received from the paired accessory 15 corresponds to the state information of the electronic device 1 in 1160, and in case of yes in 1170, maintain the pairing with the paired accessory 15 in 1180, and in case of no in 1170, release and restrict the pairing with the paired accessory 15 in 1190, and re-perform the pairing procedure in 1120 to 1190.

For example, when the same type of accessory 15 as the coupled accessory 15 is located around the electronic device 1 and the nearby accessory 15 other than the coupled accessory 15 is paired with the electronic device 1 due to noise or other reasons, the state information received from the paired accessory 15 may not correspond to the state information of the electronic device 1.

Hence, the electronic device 1 may determine whether the paired accessory 15 corresponds to the coupled accessory 15 based on whether the state information received from the paired accessory 15 corresponds to the state information of the electronic device 1 including at least one of the operation command information or the sensing information of the sensing module 110, to determine validity of wireless connection with the paired accessory 15 and repeatedly attempt wireless connection with the coupled accessory 15 when a wrong connection is made, thereby increasing accuracy in wireless connection.

Meanwhile, the embodiments of the disclosure may be implemented in the form of a recording medium for storing instructions to be carried out by a computer. The instructions may be stored in the form of program codes, and when executed by a processor, may generate program modules to perform operations in the embodiments of the disclosure. The recording media may correspond to computer-readable recording media.

The computer-readable recording medium includes any type of recording medium having data stored thereon that may be thereafter read by a computer. For example, it may be a read only memory (ROM), a random access memory (RAM), a magnetic tape, a magnetic disk, a flash memory, an optical data storage device, etc.

The embodiments of the disclosure have thus far been described with reference to accompanying drawings. It will be obvious to those of ordinary skill in the art that the disclosure may be practiced in other forms than the embodiments of the disclosure as described above without changing the technical idea or essential features of the disclosure. The above embodiments of the disclosure are only by way of example, and should not be construed in a limited sense.

What is claimed is:

1. An electronic device comprising:
   at least one sensor;
   a communicator including circuitry configured to perform wireless communication; and
   a controller configured to:
      based on an output of the at least one sensor detecting coupling of the electronic device to an accessory of the electronic device, control the communicator to execute pairing according to an advertising signal having a highest strength among advertising signals outputted by a plurality of accessories of a type that is same as the accessory coupled to the electronic device, and receive state information from a paired accessory, which is paired with the communicator according to the pairing, and identify validity of the pairing of the paired accessory based on whether the state information received from the paired accessory corresponds to state information of the electronic device.

2. The electronic device of claim 1, wherein the controller is configured to control the communicator to scan for the advertising signals outputted by the plurality of accessories of the same type as the type of the accessory coupled to the electronic device based on the detection of the coupling of the accessory.

3. The electronic device of claim 1, wherein the controller is configured to control the communicator to transmit or receive state information to or from the paired accessory.

4. The electronic device of claim 1, wherein the controller is configured to release the pairing with the paired accessory provided the paired accessory does not correspond to the accessory coupled to the electronic device.

5. The electronic device of claim 1, wherein the controller is configured to restrict the pairing with the paired accessory based on the paired accessory not corresponding to the accessory coupled to the electronic device, and control the communicator to pair with another accessory based on a strength of the advertising signals.

6. The electronic device of claim 1, wherein the state information of the electronic device comprises:
   at least one of sensing information received from the at least one sensor, or operation command information.

7. The electronic device of claim 6, wherein the controller is configured to, based on the accessory coupled to the electronic device being a battery, determine whether the paired accessory which is a battery corresponds to the accessory coupled to the electronic device as the battery based on whether discharge state information received from the paired accessory as the battery corresponds to the operation command information or sensing information of the at least one sensor.

8. The electronic device of claim 6, wherein the electronic device is a vacuum cleaner, and
   wherein the controller is configured to:
      based on the accessory coupled to the electronic device being a brush, determine whether the paired accessory which is a brush corresponds to the accessory coupled to the electronic device as the brush based on whether state information received from the paired accessory as the brush corresponds to the operation command information or sensing information of a current applied to the accessory coupled to the electronic device as the brush.

9. The electronic device of claim 6, wherein the electronic device is a vacuum cleaner, and
   wherein the controller is configured to:
      based on the accessory coupled to the electronic device being a docking station and state information received from the docking station indicating that a dust discharge course is performed, determine whether the paired accessory as the docking station corresponds to the accessory coupled to the electronic device as the docking station based on whether the state information received from the paired accessory as the docking station corresponds to the operation command information or sensing information of a pressure sensor of the at least one sensor.

10. The electronic device of claim 6, wherein the electronic device is a vacuum cleaner, and wherein the controller is configured to:

based on the accessory coupled to the electronic device being a docking station and state information received from the docking station indicating that a charge course is performed, determine whether the paired accessory as the docking station corresponds to the accessory coupled to the electronic device as the docking station based on whether state information received from the paired accessory as the docking station corresponds to the operation command information or sensing information of a charge current of a battery coupled to the electronic device.

11. A method of controlling an electronic device including at least one sensor and a communicator to perform wireless communication, the method comprising:

based on an output of the at least one sensor detecting coupling of the electronic device to an accessory of the electronic device, controlling the communicator to execute pairing according to an advertising signal having a highest strength among advertising signals outputted by a plurality of accessories of a type that is same as the accessory coupled to the electronic device; and receive state information from a paired accessory, which is paired with the communicator according to the pairing, and identify validity of the pairing of the paired accessory based on whether the state information received from the paired accessory corresponds to state information of the electronic device.

12. The method of claim 11, further comprising:

controlling the communicator to scan for the advertising signals outputted by the plurality of accessories of the same type as the type of the accessory coupled to the electronic device based on the detection of the coupling of the accessory.

13. The method of claim 11, further comprising:

controlling the communicator to transmit or receive state information to or from the paired accessory.

14. The method of claim 11, further comprising:

releasing the pairing with the paired accessory provided the paired accessory does not correspond to the accessory coupled to the electronic device.

15. The method of claim 11, further comprising:

restricting the pairing with the paired accessory based on the paired accessory not corresponding to the accessory coupled to the electronic device; and controlling the communicator to pair with another accessory based on a strength of the advertising signals.

16. The method of claim 11, wherein the state information of the electronic device comprises:

at least one of sensing information received from the at least one sensor, or operation command information.

17. The method of claim 16, further comprising:

based on the accessory coupled to the electronic device being a battery, determining whether the paired accessory which is a battery corresponds to the accessory coupled to the electronic device as the battery based on whether discharge state information received from the paired accessory as the battery corresponds to the operation command information or sensing information of the at least one sensor.

18. The method of claim 16, wherein the electronic device is a vacuum cleaner, the method further comprising:

based on the accessory coupled to the electronic device being a brush, determining whether the paired accessory which is a brush corresponds to the accessory coupled to the electronic device as the brush based on whether state information received from the paired accessory as the brush corresponds to the operation command information or sensing information of a current applied to the accessory coupled to the electronic device as the brush.

19. The method of claim 16, wherein the electronic device is a vacuum cleaner, the method further comprising:

based on the accessory coupled to the electronic device being a docking station and state information received from the docking station indicating that a dust discharge course is performed, determining whether the paired accessory as the docking station corresponds to the accessory coupled to the electronic device as the docking station based on whether the state information received from the paired accessory as the docking station corresponds to the operation command information or sensing information of a pressure sensor of the at least one sensor.

20. The method of claim 16, wherein the electronic device is a vacuum cleaner, the method further comprising:

based on the accessory coupled to the electronic device being a docking station and state information received from the docking station indicating that a charge course is performed, determining whether the paired accessory as the docking station corresponds to the accessory coupled to the electronic device as the docking station based on whether state information received from the paired accessory as the docking station corresponds to the operation command information or sensing information of a charge current of a battery coupled to the electronic device.

* * * * *